United States Patent [19]

Penton, Jr.

[11] 4,049,633

[45] Sept. 20, 1977

[54] METHOD FOR IMPROVING DISPERSE DYEABILITY OF POLYESTERS AND PRODUCT THEREOF

[75] Inventor: Harold Roy Penton, Jr., Asheville, N.C.

[73] Assignee: Akzona Incorporated, Asheville, N.C.

[21] Appl. No.: 725,909

[22] Filed: Sept. 22, 1976

[51] Int. Cl.² .................. C08G 63/70; C08G 63/18
[52] U.S. Cl. ..................... 260/75 T; 8/165; 8/168 C; 260/75 N; 260/75 S
[58] Field of Search ............... 260/75 S, 75 N, 75 T; 8/165, 168 C, 168 CA, 168 CB

[56] References Cited
U.S. PATENT DOCUMENTS

| 2,541,822 | 2/1951 | Kvalnes et al. | 8/165 X |
| 2,921,945 | 1/1960 | Adams et al. | 8/165 X |
| 3,018,272 | 1/1962 | Griffing et al. | 260/75 S |
| 3,700,644 | 10/1972 | Price et al. | 260/75 S |
| 3,856,753 | 12/1974 | Henry et al. | 260/75 N |
| 3,875,082 | 4/1975 | Finck | 260/75 S X |

Primary Examiner—Harold D. Anderson
Assistant Examiner—W. C. Danison, Jr.
Attorney, Agent, or Firm—Francis W. Young; Jack H. Hall

[57] ABSTRACT

The disperse dyeability of a fiber or film forming polyester resin is improved by dispersing substantially uniformly in a polyester resin in which it is at least partially soluble a compound having the formula

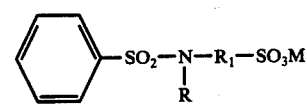 (1)

or

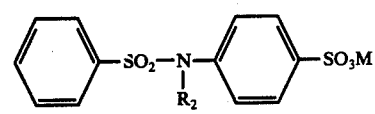 (2)

wherein R is benzyl or phenethyl, $R_1$ is ethylene or propylene, $R_2$ is hydrogen or lower alkyl and M is an alkali metal.

12 Claims, No Drawings

METHOD FOR IMPROVING DISPERSE DYEABILITY OF POLYESTERS AND PRODUCT THEREOF

This invention relates generally to fiber and film forming polyester resins and more particularly to a method of improving the disperse dyeability of such resins and to the resulting product.

Fiber and film forming polyester resins such as those disclosed in U.S. Pat. Nos. 2,465,319; 2,437,232; 2,739,957; 2,895,946 and 3,018,272 are used commercially for making fabrics, carpets and the like. A polyester resin containing a predominant number of segments derived by esterification of terephthalic acid or a lower alkyl ester thereof and a dihydric alcohol is the most commonly used polyester resin for making fibers. Such fibers can be used to advantage for making carpets and fabrics for various purposes.

It has been proposed heretofore to dye the polyester fibers with disperse dyes but the rate of diffusion of the dye into the fibers is too slow for commercial production. Consequently, it has been suggested that the polyester resin be modified chemically by reaction with a comonomer. The comonomer may be a polyether, aliphatic diol, diester or dicarboxylic acid such as disclosed in J. Poly. Science, 14, 15 (1959). Other prior art methods for improving the dyeability of the polyester resin fiber are disclosed in U.S. Pat. Nos. 2,895,946; 3,018,272; 3,033,824; 3,184,434; 3,313,778; 3,528,947; 3,546,180; 3,700,644; 3,853,820 and 3,856,753. Modification of the structure of the polyester resin has the disadvantage of altering the physical and textile properties of the fiber and, particularly if the modifier is a polyether, of introducing dye light-fastness problems.

It is therefore an object of this invention to provide a method for improving the disperse dyeability of a polyester resin adapted to be used for making fibers and films. Another object of the invention is to provide a fiber or film forming polyester resin having improved disperse dyeability. A more specific object of the invention is to provide a method of improving the disperse dyeability of a fiber or film forming poly(ethyleneterephthalate)ester resin and the improved product.

The foregoing objects and others are accomplished in accordance with this invention, generally speaking, by providing a method for improving the disperse dyeability of a fiber and/or film forming polyester resin prepared by esterifying an aromatic dicarboxylic acid and dihydric alcohol wherein a water soluble organic sulfonamide sulfonate having the formula

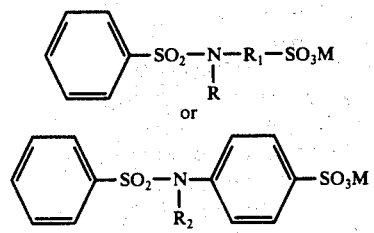

wherein R is benzyl or phenethyl, $R_1$ is ethylene or propylene, $R_2$ is hydrogen or lower alkyl and M is an alkali metal, is substantially uniformly dispersed in a polyester resin in which it is at least partially soluble. Preferred embodiments of the invention contemplate improving the disperse dyeability of an aromatic polyester fiber or film by mixing with the polyester an alkali metal salt of N-benzyl-N-propylsulfonate benzene sulfonamide, N-phenethyl-N-propylsulfonate benzene sulfonamide or N-para-benzene sulfonate benzene sulfonamide. The alkali metal may be sodium, potassium or lithium.

The polyester resin may be prepared by esterifying only one aromatic polyester or lower alkyl ester thereof or it may be a copolyester. It has been found that, when the organic sulfonamide sulfonate of formula (2) is dispersed in a copolyester, it is not necessary to use a carrier. The organic sulfonamide sulfonates of formulae (1) and (2) are non-reactive with the components of the polyester and may be included in the mixture of dicarboxylic acid and dihydric alcohol during esterification or they may be added to a melt of the polyester resin which is to be melt spun to form a fiber. The invention thus contemplates a method for improving the disperse dyeability of a fiber or film forming polyester resin such as poly(ethylene terephthalate) ester or a copolyester which is predominantly poly(ethylene terephthalate)ester with an organic sulfonamide sulfonate which is not reactive with the polyester resin and is water soluble.

Any suitable amount of the organic sulfonamide sulfonate which will dissolve in the polyester may be used but for most purposes from about 2% to about 10% by weight based on the weight of the polyester resin is sufficient for improving the disperse dyeability of the polyester resin. Preferably, about 3% to about 8% by weight based on the weight of the polyester is used in accordance with the invention.

The organic sulfonamide sulfonates of formula (1) or (2) above may be included in the polyester resin in amounts which will improve the dyeability of the resin without significantly affecting the physical or textile properties of the polyester resin adversely and thereby avoid the prior art practice of using a copolyester or lower melting point and poorer thermal stability and ultra violet light stability. However, the invention contemplates copolyesters as well as homopolyesters where modification of the physical and textile properties by a comonomer is not objectionable. In fact, when the alkali metal salts of N-para-benzene sulfonate sulfonamide or N-phenethyl-N-propylsulfonate benzene sulfonamide are used, the carrier usually required for disperse dyeing is not required.

The organic sulfonamide sulfonates contemplated by the invention may be prepared by any known procedure. N-benzyl-N-propylsulfonate benzenesulfonamide may be prepared, for example, by the reactions

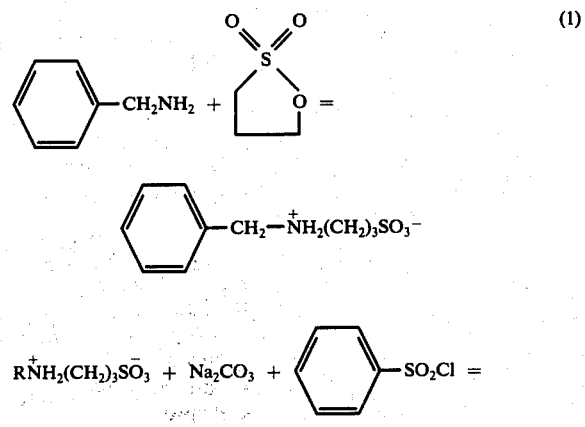

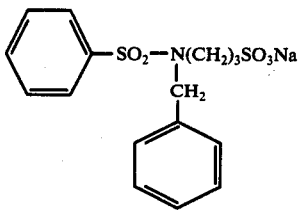

Phenethylamine is substituted for benzyl amine to prepare N-phenethyl propylsulfonate benzenesulfonamide. The sodium salt of sulfanilic acid and benzene sulfonyl chloride are condensed in the presence of sodium carbonate to prepare the sodium salt of N-para-benzenesulfonate benzenesulfonamide or the corresponding compounds where $R_2$ in formula (2) is a methyl, ethyl, propyl, isopropyl, N-butyl, tertiary butyl or pentyl radical.

EXAMPLE I

PREPARATION OF SODIUM SALT OF N-BENZYL-N-PROPYLSULFONATE BENZENESULFONAMIDE

About 107.2 grams of benzylamine were dissolved in about 150 mls of methanol contained in a three-necked, round bottom reaction flask which was fitted with a stirring rod, thermometer and a dropping funnel. The reaction flask was cooled in an ice-water bath to 15° C. and about 122.1 g of propanesultone dissolved in about 350 ml of methanol were added dropwise to the reaction flask via the dropping funnel over a period of two hours. When the addition was complete, the reaction mixture was allowed to warm to ambient temperatures and stirring was continued for an additional 16 hours. The solvent was then evaporated under reduced pressure on a rotary evaporator to yield a tan solid. This solid was extracted with refluxing ethanol to remove the colored impurities. The resulting colorless solid was collected by filtration and vacuum dried to give about 108.2 g of the desired zwitterionic intermediate.

About 100 grams of zwitterionic intermediate and about 46.2 g of sodium carbonate were dissolved in about 500 ml of distilled water contained in a three-necked flask equipped with a thermometer, stirring rod and dropping funnel. The solution in the reaction flask was heated to 50° C. and about 77 g of benzenesulfonyl chloride dissolved in about 300 ml of acetone were added dropwise to the reaction flask over a period of 1 hour. When the addition was complete, the reaction mixture was stirred for an additional 2 hours at 50° C. The solvents were then removed under reduced pressure to give a light yellow solid. Three recrystallizations from ethanol-water (90:10; v:v) gave the desired product as a colorless crystalline solid.

EXAMPLE II

PREPARATION OF SODIUM SALT OF N-PHENETHYL-N-PROPYLSULFONATE BENZENESULFONAMIDE

About 121.2 grams of phenethylamine were dissolved in about 100 mls of methanol contained in a three-necked round bottom reaction flask equipped with a stirring rod, thermometer and dropping funnel. The reaction flask was cooled in an ice-water bath to 15° C. and about 122.1 g of propane sultone dissolved in about 250 ml of methanol were added dropwise over a period of one hour to the reaction flask. When the addition was complete, the reaction mixture was allowed to warm to ambient temperatures and stirring was continued for an additional 16 hours during which time a colorless precipitate formed. The precipitate was collected by filtration and washed with cold methanol to give about 147.1 g of the desired zwitterionic intermediate.

About 87 g of the zwitterionic intermediate were dissolved in about 350 ml of distilled water contained in a three-necked round bottom flask equipped with a stirring rod, thermometer and dropping funnel. The solution was heated to 60° C., and about 38.2 g of sodium carbonate were added to the reaction flask in three portions. With the reaction temperature maintained at 60° C., about 63.3 g of benzenesulfonyl chloride dissolved in about 150 ml acetone were added dropwise over a period of 1 hour to the reaction flask. When the addition was complete, stirring was continued for 3 hours at 60° C., and then the reaction mixture was allowed to cool to ambient temperatures during which time a tan solid precipitated from the solution. The solid was collected by filtration and recrystallized five times from water to give about 56.7 g of the desired product as a colorless solid.

EXAMPLE III

PREPARATION OF SODIUM SALT OF N-PARABENZENESULFONATE BENZENESULFONAMIDE

About 86.6 g of the sodium salt of sulfanilic acid and about 26.4 g of sodium carbonate were dissolved in about 500 ml of distilled water contained in a three-necked round bottom reaction flask equipped with a stirring rod, thermometer and dropping funnel. The solution was heated to 60° C. and about 88.3 g of benzene sulfonyl chloride were added to the reaction flask over a period of two hours. When the addition was complete, the reaction mixture was allowed to cool and the solvent was removed under reduced pressure to give a tan solid. The solid was recrystallized twice from isopropanol to give about 68.2 g of the desired product as a colorless solid.

EXAMPLE IV

About 300 grams of dimethylterephthalate (DMT), about 241 g of ethylene glycol and about 0.149 g of manganous benzoate were heated for 70 minutes in a nitrogen atmosphere, the temperature rising to 220° C., with evolution of methanol. The sodium salt of N-benzyl-N-propyl sulfonate benzenesulfonamide (about 24 g) 8 wt. % based on starting amount of DMT, about 0.238 g of antimony tributylate and about 0.268 g of trimethyl phosphate were then added and the pressure was reduced to 0.1 mm of mercury and the temperature increased to 280° C. After 75 minutes a polyester was obtained having an intrinsic viscosity of 0.63 and a melting point of 249° C.

The polyester was spun and drawn as 30/6 yarn. The yarn exhibited good thermal and light stability having 83% retained tenacity after being heated at 180° C. for 120 minutes and 93% retained tenacity after being exposed in a Fade-Ometer for 80 hours.

EXAMPLE V

Example IV was repeated except that no organic sulfonamide sulfonate was added to the reaction vessel.

The intrinsic viscosity of the polyester was 0.65 and the melting point was 251° C.

Knit fabrics prepared from the yarns of Examples IV and V having the same weight and construction were dyed in the same dyebath at 100° C. with 1.0% by weight based on the weight of the fabric of Duranol Blue G Grains — Disperse Blue 26 and 5% by weight, based on the weight of the fabric, Carolid 3F carrier, a commercially available carrier which is primarily biphenyl with at least 10 percent by weight polyethylene glycol dispersing agent. The depth of shade of the dyed fabrics was then measured photometrically yielding a color differential value of 35.9 between the fabrics of Examples IV and V. The color differential is the difference in photocell values between the polyester dyed samples. The greater this value the greater is the depth of shade of the experimental sample compared to that of the normal polyester sample by weight, based on the weight of the fabric. AATCC IIIA washfastness test at 75° C. and lightfastness tests in the Carbon-Arc Fade-Ometer at 10, 20, 40 and 80 hours were performed on the experimental dyed sample and good to excellent ratings were obtained. Hence, the fabric made with yarns of Example IV had a much deeper shade than those made from yarns of Example V.

EXAMPLE VI

Example IV was repeated except that about 15 grams (5% by weight based on the weight of DMT) of the sodium salt of N-benzyl-N-propylsulfonate benzenesulfonamide were added to the polyester melt instead of during the esterification. The intrinsic viscosity of the polyester was 0.64 and the melting point was 251° C.

The polyester was spun and drawn as 30/6 yarn. The yarn had good thermal and light stability having 95% retained tenacity after being heated at 180° C. for 120 minutes and 94% retained tenacity after being exposed in a Fade-Ometer for 80 hours.

EXAMPLE VII

Example IV was repeated except that about 15 g (5 wt. % based on DMT) of the sodium salt of N-phenethyl-N-propylsulfonate benzenesulfonamide were added to the polyester prepolymer melt instead of the N-benzyl derivative. The resulting polyester had an intrinsic viscosity of 0.63 and a melting point of 253° C. This polyester was spun and drawn into 30/6 yarn which had 78% retained tenacity after being heated at 180° C. for 120 minutes and 96% retained tenacity after being exposed in a Fade-Ometer for 80 hours. Knit fabrics prepared from this yarn were dyed according to the procedure described in Example IV to give a color differential of 38.5 when compared with fabrics made with the yarns of Example V. Lightfastness and washfastness properties of this dyed experimental fabric were good to excellent.

EXAMPLE VIII

This example demonstrates the conventional method for improving the disperse dyeability of polyester by incorporation of a comonomer into the polymer. It will be readily seen that the physical properties of this copolyester are inferior to those of polyesters containing sulfonamide sulfonates. Dimethylterephthalate (about 276.1 g), about 26.8 g of dimethylazelate, about 241 g of ethylene glycol and about 0.149 g of manganous benzoate were heated for 70 minutes in a nitrogen atmosphere, the temperature rising to 220° C. with evolution of methanol. Antimony tributyrate (about 0.238 g) and about 0.268 g of trimethyl phosphate were then added and the pressure reduced to 0.1 mm of mercury, and the temperature increased to 280° C. After 75 minutes, a polyester was obtained having an intrinsic viscosity of 0.66 and a melting point of 239° C. This polyester was spun and drawn into 30/6 yarn which had only 64% retained tenacity after being heated at 180° C. for 120 minutes and only 87% retained tenacity after being exposed in a Fade-Ometer for 80 hours. When fabric from this yarn was dyed along with fabric prepared from the polyester of Example V according to the procedure outlined in Example IV, a color differential of 38.5 was obtained. Washfastness and lightfastness of the dyed copolyester fabric were good to excellent.

The physical properties of the polyesters of Examples IV through VIII are tabulated in Table I to facilitate comparison.

TABLE I

| EXAMPLE | | INTRINSIC VISCOSITY OF POLYESTER | MELTING POINT OF POLYESTER ° C. | THERMAL STABILITY OF YARN (% TENACITY) AFTER 120 MIN. AT 180° C. | ULTRA VIOLET LIGHT STABILITY OF DYED YARN (% TENACITY) AFTER 80 HRS. | COLOR DIFFERENTIAL |
|---|---|---|---|---|---|---|
| IV | | 0.63 | 249 | 83 | 93 | 35.9 |
| V | (Control) | 0.65 | 251 | 78 | 94 | — |
| VI | | 0.64 | 251 | 95 | 94 | 36.5 |
| VII | | 0.63 | 253 | 78 | 96 | 38.5 |
| VIII | | 0.66 | 239 | 64 | 87 | 38.5 |

It should be noted that the melting points of the polyesters of Examples IV, VI and VIII containing an alkali metal salt of an organic sulfonamide sulfonate in accordance with this invention are substantially the same as that of the control polyester of Example V while the melting point of the copolyester of Example VIII is significantly lower. Although the yarn of Example VIII had a slightly deeper depth of dye coloration than the yarn of Example VI, the color differential between the yarns of Example V (Control) and the yarns of Example VI is significant and indicates the improved disperse dyeability of the product of this invention. While these results illustrate that it is not necessary to make a copolyester when using the organic sulfonamide sulfonates in accordance with this invention, they also show that the additives of the invention can be used with copolyesters where other considerations make it desirable to use a copolyester.

The following examples demonstrate the improved disperse dyeability of copolyesters without the need of a carrier when sulfonamide sulfonates are used to improve the disperse dyeability.

EXAMPLE IX

About 276.1 grams of dimethylterephthalate, about 19.7 g of dimethylglutarate, about 241 g of ethylene glycol and about 0.149 g of manganous benzoate were heated for 70 minutes in a nitrogen atmosphere, the temperature rising to 220° C., with evolution of methanol. Antimony tributyrate (about 0.238 g), about 0.268 g of trimethylphosphate and about 7.9 g (3 wt. % based on DMT and dimethylglutarate) of the sodium salt of N-para-benzenesulfonate benzenesulfonamide (prepared as shown in Example III) were then added and the pressure then reduced to 0.1 mm of mercury and the temperature increased to 280° C. After 80 minutes a polyester was obtained having an intrinsic viscosity of 0.45. This polyester was spun and drawn as 30/6 yarn.

Knit fabric prepared from this yarn was dyed at 100° C. with 1.0% by weight, based on the weight of the fabric, Eastman Polyester Yellow W - Disperse Yellow 42. No carrier was employed in the dyebath. The dyebath exhaustion (i.e., an indication of the amount of dye picked-up by the fabric) was found to be 83%. Washfastness and lightfastness properties of this dyed fabric were good to excellent.

EXAMPLE X

In a comparative example, when a fabric from a copolyester prepared as in Example IX but without the addition of the sulfonamide sulfonate was dyed under the above conditions with the addition of 5% by weight, based on the weight of the fabric, Carolid 3F carrier, the dyebath exhaustion was only 33%.

EXAMPLE XI

Example IX was repeated except that about 7.9 g of the sodium salt of N-phenethyl-N-propylsulfonate benzenesulfonamide were added to the prepolymer melt. The resulting polyester had an intrinsic viscosity of 0.63. This polyester was spun and drawn into 30/6 yarn. When fabric from this yarn was dyed according to the procedure described in Example IX without carrier, the dyebath exhaustion was 80%. Washfastness and lightfastness properties of the dyed fabric were excellent.

While the invention is most advantageous commercially for dyeing fabrics containing poly(ethylene terephthalate) ester, it is also applicable to the dyeing of fabrics containing other fiber forming polyesters such as, for example, polyesters prepared by esterification of isophthalic acid and ethylene glycol, and the like. In general the disperse dyeability of all film and fiber forming polyesters may be improved in accordance with the invention. For example, polyesters made from at least a major portion of terephthalic acid as the acid component, and the polymethylene glycols are especially useful. Cyclic glycols such as 1,4-cyclohexanedimethanol, 2,2,4,4-tetramethyl-1,3-cyclobutanediol, p-xylene glycol and the norbornanediols can be used. Polyesters prepared from hydroxy-acids such as p-(2-hydroxyethoxy) benzoic acid are also included. The polyesters contemplated herein and in the claims include all types of high melting, crystalline polyesters and copolyesters as well as noncrystalline or slightly crystalline fiber and film forming polyesters. The copolyesters may be, for example, copolyesters of dimethyl terephthalate and dimethyl azulate or dimethyl glutarate or the like. These polyesters are prepared by techniques well known to the art by reaction of one or more dicarboxylic acids with one or more dihydric alcohols. The dicarboxylic acid and dihydric alcohol may be reacted in either their esterified or in their unesterified form.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. A method for improving the disperse dyeability of a film or fiber forming polyester which comprises dispersing in the polyester a compound of the formula

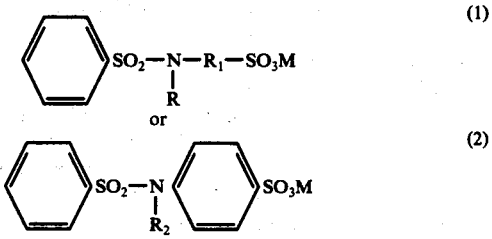

wherein R is benzyl or phenethyl, $R_1$ is ethylene or propylene, $R_2$ is hydrogen or lower alkyl and M is an alkali metal.

2. The method of claim 1 wherein the compound mixed with the polyester is the alkali metal salt of N-benzyl-N-propyl sulfonate benzene sulfonamide.

3. The method of claim 1 wherein the compound mixed with the polyester is the alkali metal salt of N-phenethyl-N-propyl sulfonate benzene sulfonamide.

4. The method of claim 1 wherein the compound mixed with the polyester is the alkali metal salt of N-para-benzene sulfonate benzene sulfonamide.

5. The method of claim 1 wherein from about 2% to about 10% of the said compound based on the weight of the polyester is mixed with the polyester.

6. The method of claim 1 wherein the polyester is poly(ethylene terephthalate)ester.

7. A polyester having improved disperse dyeability containing a compound of the formula

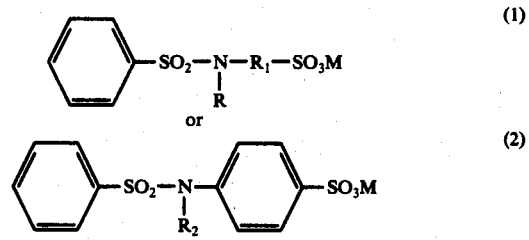

wherein R is benzyl or phenethyl, $R_1$ is ethylene or propylene, $R_2$ is hydrogen or lower alkyl and M is an alkali metal.

8. The polyester of claim 7 containing a compound of formula (1).

9. The polyester of claim 7 containing a compound of formula (2).

10. The polyester of claim 7 containing the compound N-phenethyl-N-propyl sulfonate benzene sulfonamide.

11. The polyester of claim 7 containing the compound N-para-benzene sulfonate benzene sulfonamide.

12. The polyester of claim 7 which is predominantly a poly(ethyleneterephthalate)ester.

* * * * *